United States Patent
Swenson

(10) Patent No.: US 9,221,204 B2
(45) Date of Patent: Dec. 29, 2015

(54) TECHNIQUES TO MOLD PARTS WITH INJECTION-FORMED APERTURE IN GATE AREA

(71) Applicant: Kortec, Inc., Rowley, MA (US)

(72) Inventor: Paul M. Swenson, South Hamilton, MA (US)

(73) Assignee: Kortec, Inc., Rowley, MA (US)

(*) Notice: Subject to any disclaimer, the term of this patent is extended or adjusted under 35 U.S.C. 154(b) by 212 days.

(21) Appl. No.: 13/827,293

(22) Filed: Mar. 14, 2013

(65) Prior Publication Data

US 2014/0272283 A1 Sep. 18, 2014

(51) Int. Cl.
| | |
|---|---|
| B29C 45/28 | (2006.01) |
| B29C 45/23 | (2006.01) |
| B29C 45/16 | (2006.01) |
| B29C 45/76 | (2006.01) |
| B32B 3/02 | (2006.01) |

(52) U.S. Cl.
CPC ........... *B29C 45/231* (2013.01); *B29C 45/1603* (2013.01); *B29C 45/7613* (2013.01); *B32B 3/02* (2013.01); *B29C 45/2896* (2013.01); *B29C 2045/2862* (2013.01); *B29C 2045/2882* (2013.01); *Y10T 428/24322* (2015.01)

(58) Field of Classification Search
CPC ................... B29C 45/2896; B29C 2045/2862; B29C 2045/2882; B29C 45/1603; B29C 45/231; B29C 45/7613
USPC ...................................................... 264/328.8
See application file for complete search history.

(56) References Cited

U.S. PATENT DOCUMENTS

| | | | | |
|---|---|---|---|---|
| 4,521,179 | A | * | 6/1985 | Gellert .......................... 425/548 |
| 4,530,654 | A | * | 7/1985 | Rose ............................. 425/566 |
| 5,423,672 | A | * | 6/1995 | Gordon ......................... 425/564 |
| 5,695,793 | A | * | 12/1997 | Bauer ........................... 425/564 |
| 5,783,234 | A | * | 7/1998 | Teng ............................. 425/549 |
| 5,897,822 | A | * | 4/1999 | van Manen et al. .......... 264/255 |
| 5,914,138 | A | | 6/1999 | Swenson |
| 6,179,604 | B1 | * | 1/2001 | Takeda .......................... 425/547 |
| 6,187,241 | B1 | | 2/2001 | Swenson |
| 6,596,213 | B2 | | 7/2003 | Swenson |
| 6,649,101 | B2 | | 11/2003 | Kermet |

(Continued)

*Primary Examiner* — Jill Heitbrink
(74) *Attorney, Agent, or Firm* — McCarter & English, LLP; David R. Burns

(57) ABSTRACT

Methods and systems for co-extruding multiple polymeric material flow streams into a mold cavity to produce a molded plastic article having an injection-formed aperture in gate region of the article are disclosed herein. A method includes providing a valve pin having a distal portion with a first diameter and a mid-portion with a second diameter smaller than the first diameter and providing a mold defining a cavity corresponding to a shape of a resulting molded plastic article. The mold has a recess aligned with a gate region of the mold, extending into the mold and configured to receive the distal portion of the valve pin when the distal portion of the valve pin extends beyond the gate region. The method includes advancing the distal portion of the valve pin into the recess until the mid-portion of the valve pin at least partially extends into the gate region, thereby establishing a flow path for a combined polymeric stream into the cavity at the gate region for forming a molded plastic article having at least one layer of a first polymeric material and at least one layer of a second polymeric material. The method also includes withdrawing the mid-portion of the valve pin from the gate region, thereby forming an injection-molded aperture in the resulting molded plastic article at the gate region.

10 Claims, 12 Drawing Sheets

(56) References Cited

U.S. PATENT DOCUMENTS

| | | |
|---|---|---|
| 6,908,581 B2 | 6/2005 | Sabin et al. |
| 7,306,446 B2 | 12/2007 | Sabin et al. |
| 7,399,442 B2 | 7/2008 | Sabin et al. |
| 7,517,480 B2 | 4/2009 | Sabin et al. |
| 8,491,290 B2 | 7/2013 | Swenson |
| 8,801,991 B2 | 8/2014 | Swenson |
| 2007/0222111 A1* | 9/2007 | Hussain et al. .......... 264/255 |
| 2011/0217496 A1 | 9/2011 | Swenson |
| 2012/0015122 A1 | 1/2012 | Swenson |
| 2013/0108834 A1 | 5/2013 | Sweetland |

* cited by examiner

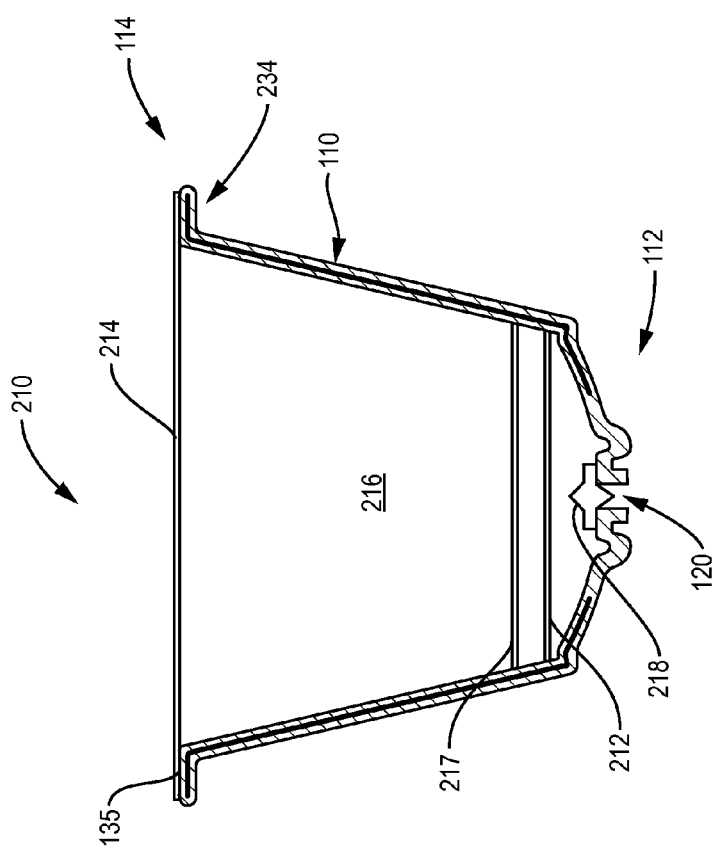
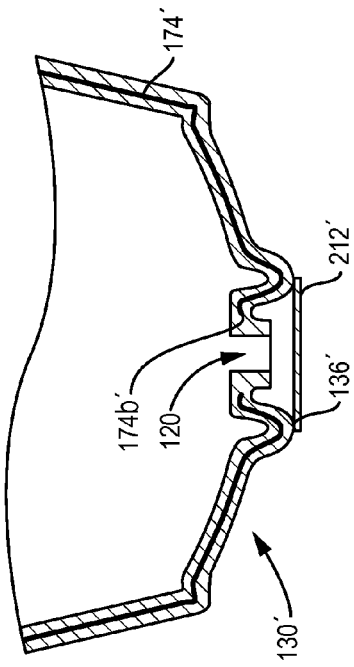
FIG. 9
FIG. 10

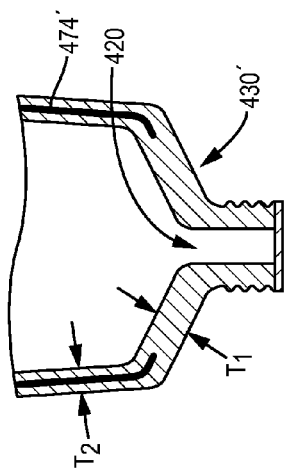
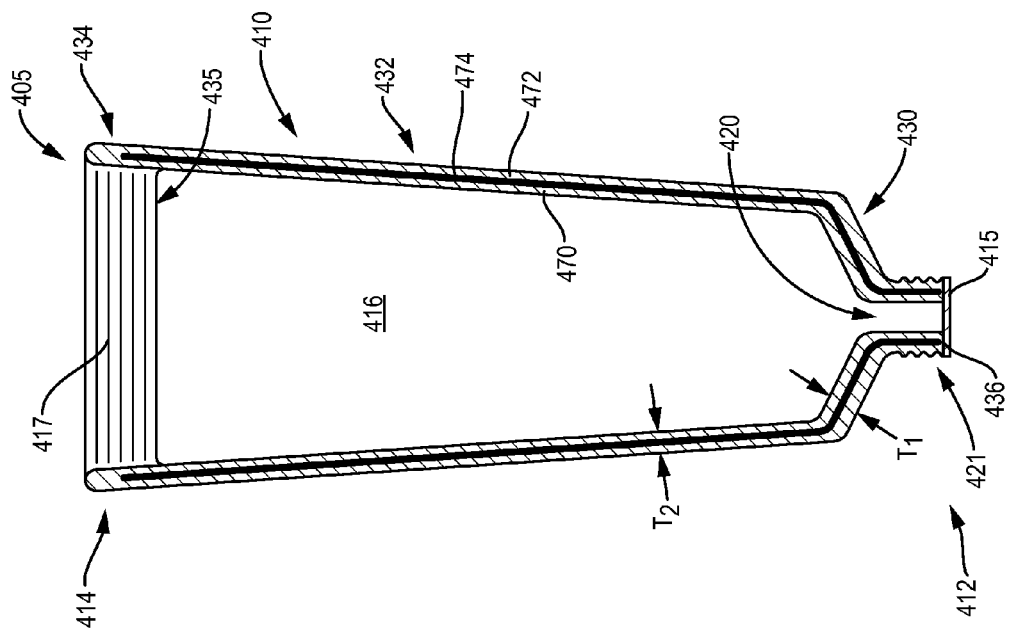

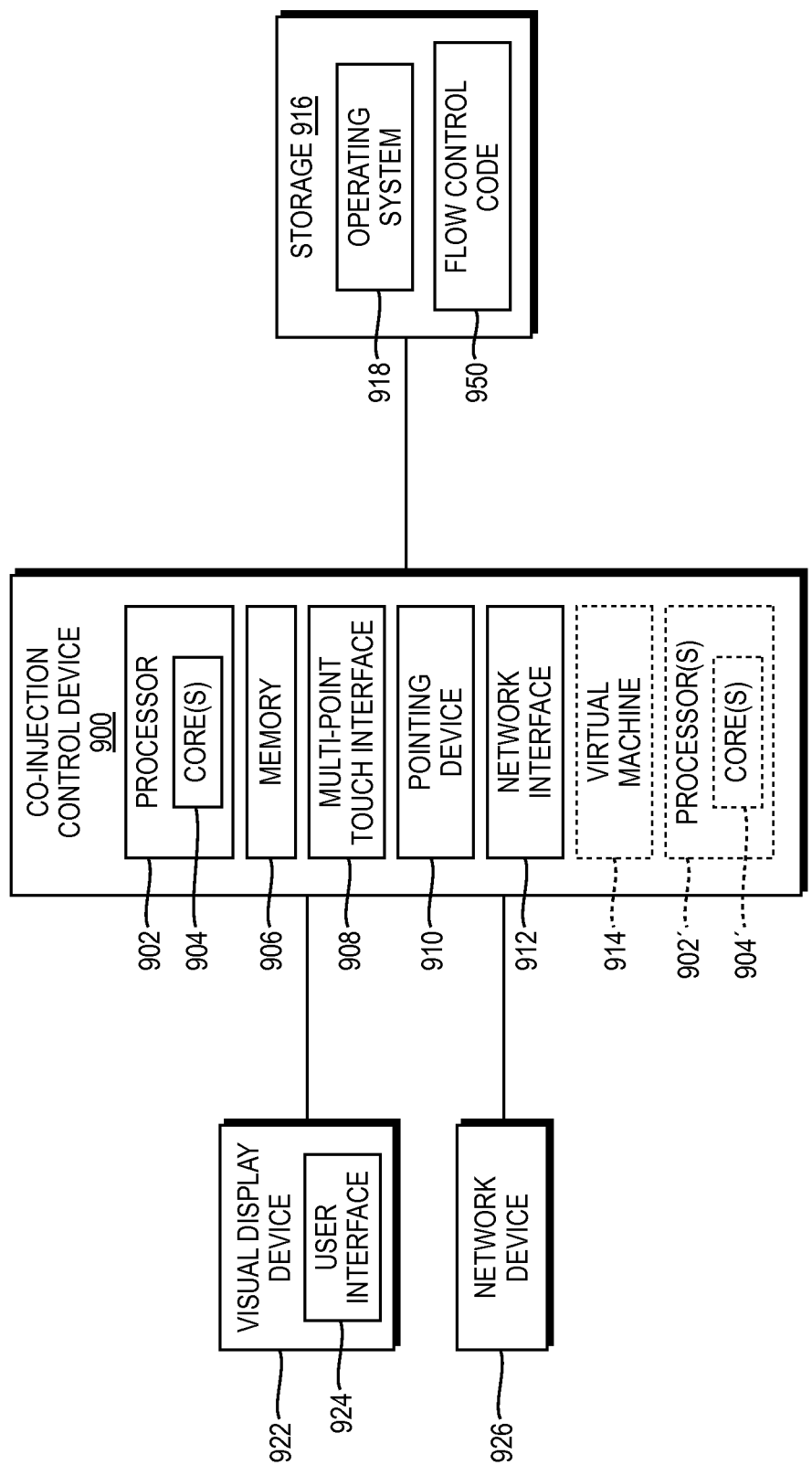

TECHNIQUES TO MOLD PARTS WITH INJECTION-FORMED APERTURE IN GATE AREA

FIELD

Example embodiments are directed to methods and systems for forming multi-layer plastic articles, such as containers used to hold food, beverages, pharmaceuticals and nutraceuticals. In particular, example embodiments relate to methods and systems for co-injection molding multi-layer plastic articles that include an aperture formed in a gate region of the container.

BACKGROUND

Multi-layer plastic articles are often used as containers to hold, food, beverages, pharmaceuticals, and nutraceuticals. Some multi-layer plastic articles are commonly made from materials such as polyethylene (PET) and polypropylene (PP). Articles made from PET and PP resist environmental degradation, and are reasonably durable, watertight, and economically produced. However, plastic materials such as PET and PP are gas (e.g., oxygen, nitrogen, etc.) permeable. For applications in which gas permeability is undesirable, for example, containers for food products, medicines and products that degrade upon gas permeation into or out of the container, a plastic article of PET or PP may include an interior layer of a barrier material or a gas scavenger material, such as ethylene vinyl alcohol (EVOH), between skin layers of PET or PP.

Molded plastic articles, such as containers for food, beverages, pharmaceuticals, nutraceuticals, etc., often have an open end used to fill the container with product. Some plastic containers also have an aperture, away from the open end. For example, some cartridges for single serve coffee machines have a multi-layer plastic body including an open top portion through which the container is filled with ground coffee and a smaller aperture in a bottom portion through which brewed coffee is dispensed. Such plastic bodies for single serve coffee machines are commonly made by first thermoforming the plastic body with a wide top portion, aligning the thermoformed article with a mechanical punch, and mechanically punching out the smaller aperture in a bottom portion. The additional separate cutting or punching step increases the complexity of the production process. Further, in applications where the accuracy or precision of the position of the aperture, or of the diameter of the aperture is important, sufficient accuracy or precision may be difficult to achieve with a punch process or a cutting process.

Other plastic containers including an open end portion and an aperture formed in a different portion of the container may commonly be formed or molded in separate pieces that are then joined together. For example, a plastic container for tooth paste (e.g., a tooth paste tube), may have a thin-walled tail end portion that is initially open to be filled with tooth paste before being sealed, and a thick-walled head end portion with a small aperture for dispensing the tooth paste. Such a container is commonly made by forming the thin-walled tail end portion, separately forming the thick-walled head end portion, and then joining the two pieces together.

SUMMARY

Example embodiments described herein include, but are not limited to, a method of co-extruding a plurality of polymeric material streams to produce a molded plastic article with a molded aperture in a gate region, a system for co-extruding a plurality of polymeric material streams to produce a molded plastic article with a molded aperture in a gate region, and a co-injection molded multilayer article having a molded aperture in a gate region.

An embodiment includes a method of co-extruding a plurality of polymeric material streams to produce a molded plastic article. The method includes providing a valve pin having a distal portion with a first diameter and a mid-portion with a second diameter smaller than the first diameter. The method also includes providing a mold defining a cavity corresponding to a shape of a resulting molded plastic article. The mold has a recess aligned with a gate region of the mold, that extends into the mold and is configured to receive the distal portion of the valve pin when the distal portion of the valve pin extends beyond the gate region. The method further includes forming a combined polymeric stream in an injection nozzle, the combined polymeric stream including a first polymeric material and a second polymeric material. The method also includes advancing the distal portion of the valve pin into the recess until the mid-portion of the valve pin at least partially extends into the gate region, thereby establishing a flow path for the combined polymeric stream into the cavity at the gate region. The flow of the combined polymeric stream into the cavity at the gate region forms a molded plastic article having at least one layer of the first polymeric material and at least one layer of the second polymeric material. The method also includes withdrawing the mid-portion of the valve pin from the gate region, thereby forming an injection-molded aperture in the resulting molded plastic article at the gate region.

In some embodiments, the aperture coincides with the distal portion of the valve pin. In some embodiments, an outer stream of the first polymeric material encases an interior stream of the second polymeric material in the combined polymeric stream.

In some embodiments, the cavity includes a sidewall portion and the flow of combined polymeric flow stream into the sidewall portion forms an inner layer of the first polymeric material, an outer layer of the first polymeric material, and an interior layer of the second polymeric material between the inner layer and the outer layer. In some embodiments, the interior layer may be a barrier layer or a scavenger layer. The interior layer may extend from the sidewall portion into the shoulder portion. The interior layer may terminate in the shoulder portion in some embodiments. The interior layer may terminate proximate to the aperture. In some embodiments, the article has a sealable portion and the interior layer terminates proximate to the sealable portion. In some embodiments, the article has a sealing surface and the interior layer terminates proximate to the sealing surface.

An embodiment includes a system for co-extruding a plurality of polymeric material streams to form at least one molded plastic article having multiple plastic layers and an injection-formed aperture proximal to a gate region of the molded plastic article. The system includes a first material source to supply a first polymeric material for use in forming at least one layer of a molded plastic article and a second material source to supply a second polymeric material for use in forming at least one layer of the molded plastic article. The system also includes an injection nozzle including a valve pin having a distal portion with a first diameter and a mid-portion with a second diameter smaller than the first diameter. The system includes a mold defining a cavity corresponding to a shape of a resulting molded plastic article, the mold including a recess aligned with the valve pin and proximal to the nozzle. The recess of the mold is configured to receive the distal portion of the valve pin when the valve pin is advanced into the recess until the mid-portion of the valve pin at least partially extends into the gate region. The injection nozzle has an egress part capable of communicating with the cavity to inject a combined polymeric stream including the first polymeric material and the second polymeric material into the cavity. The system also includes a first flow channel configured to distribute the first polymeric material from the first material source to the nozzle and a second flow channel configured to distribute the second polymeric material from the second material source to the nozzle.

In some embodiments, the nozzle is configured to form the combined polymeric stream including an inner stream and an outer stream of the first polymeric material encasing an interior stream of the second polymeric material. In some embodiments, the nozzle is configured to heat a mid-portion of the valve pin.

An embodiment includes a non-transitory computer-readable medium storing computer-executable instructions for producing a co-injection-molded plastic article using systems and/or methods described herein.

An embodiment includes a co-injection-molded plastic article with a sidewall portion having an outer layer and an inner layer including a first polymeric material, and an interior layer including a second polymeric material disposed between the outer layer and the inner layer. The article also includes an aperture formed by co-injection molding at a gate region of the article and a shoulder portion disposed between the sidewall portion and the gate region with the interior layer of the sidewall portion extending into the shoulder portion.

BRIEF DESCRIPTION OF THE DRAWINGS

The drawings are intended to illustrate the teachings taught herein and are not intended to show relative sizes and dimensions, or to limit the scope of examples or embodiments. In the drawings, the same numbers are used throughout the drawings to reference like features and components of like function.

FIG. 9 schematically illustrates a cross-sectional view of the co-injection-molded plastic article of FIG. 8 in use as a container, in accordance with some embodiments.

FIG. 10 schematically illustrates a cross-sectional detail view of a variation of the container of FIG. 9 having an external seal at a first end portion of the container, in accordance with some embodiments.

FIG. 11 schematically illustrates a cross-sectional view of another co-injection-molded plastic article in use as a container, in accordance with some embodiments.

FIG. 12 schematically illustrates a cross-sectional detail view of a variation of the container of FIG. 11 having a barrier layer that terminates in a shoulder portion of the container, in accordance with some embodiments.

FIG. 14 schematically illustrates an exemplary computing environment suitable for practicing exemplary embodiments taught herein.

DETAILED DESCRIPTION

Example embodiments include methods and systems for co-extruding a plurality of polymeric material streams to produce a molded plastic article having multiple layers and a molded aperture formed in a gate region of the article. Such methods simplify a production process by producing the plastic article and the formed aperture in the same injection-molding process, in comparison with processes in which an aperture is punched out after an article is formed, and in comparison with processes in which different portions of the article are formed separately and then joined together.

Exemplary systems and methods employ an injection nozzle with a valve pin having a distal portion with a larger diameter than that of a mid-portion of the valve pin. Exemplary systems and methods also employ a mold having a cavity and a recess aligned with a gate region of the cavity, extending into the mold and configured to receive the distal portion of the valve pin. In use, the distal portion of the valve pin is advanced into the recess and the mid-portion of the valve pin extends at least partially into the gate region of the cavity thereby establishing a flow path for the combined polymeric stream into the cavity for forming a molded plastic article. After the cavity is filled or substantially filled, the valve pin is withdrawn from the recess and cavity. More specifically, the mid-portion of the valve pin is withdrawn from the gate region, thereby stopping the flow of the combined polymeric flow stream into the cavity, and the distal portion of the valve pin is withdrawn from the recess through the gate region of the cavity, thereby forming a molded aperture in a region of a resulting molded plastic article corresponding to the gate region of the cavity.

Figure 1:
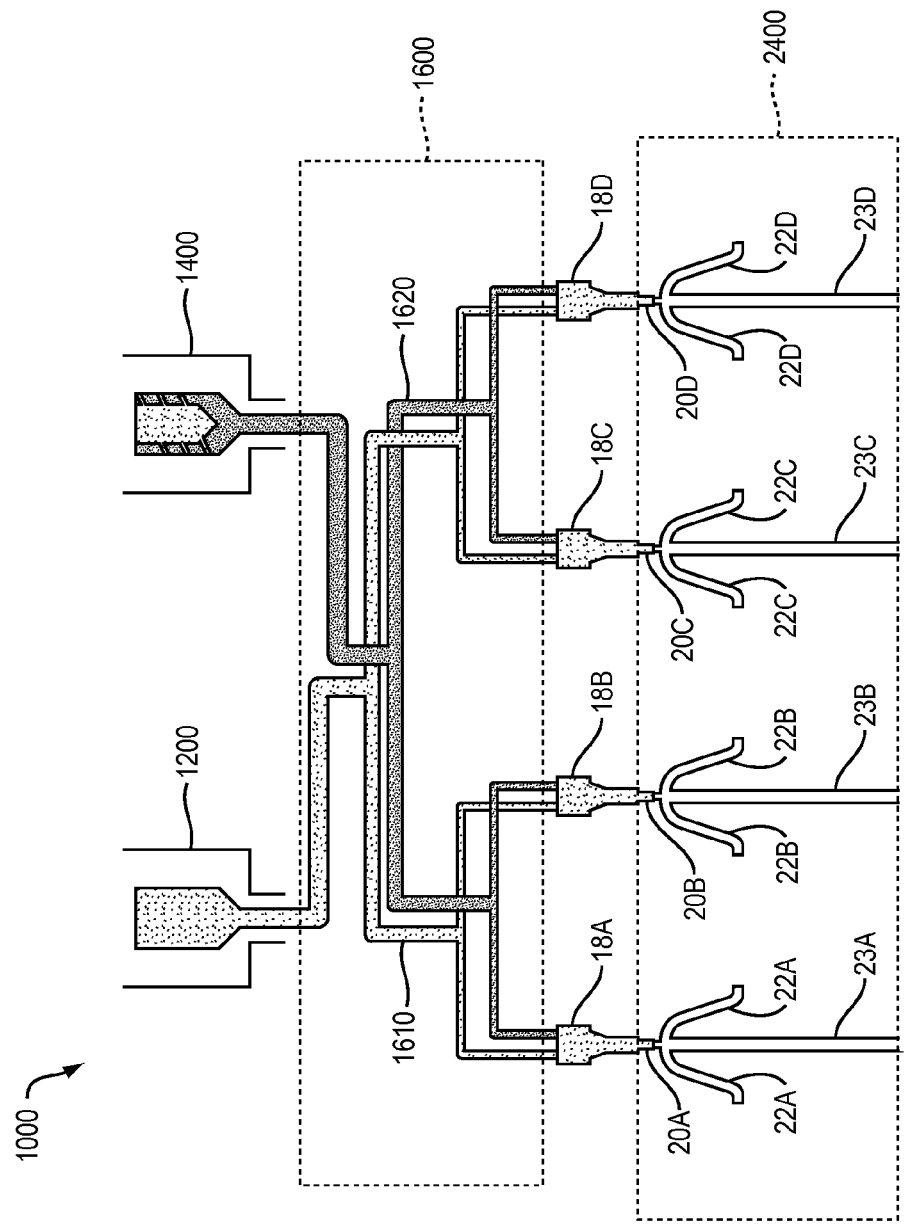
FIG. 1 is schematic cross-sectional view of a co-injection molding system for producing one or more multi-layer molded plastic articles, each having a molded aperture formed in a gate region of the article, in accordance with various embodiments.

FIG. 1 illustrates a system 1000 suitable for practicing exemplary embodiments. Co-injection molding system 1000 is configured to co-inject at least two polymeric plastic material streams into a mold cavity to produce one or more articles each having multiple co-injected plastic layers and a molded aperture in a gate region of the article. Co-injection molding system 1000 includes a first material source 1200, a second material source 1400. First material source 1200 supplies a first polymeric material for use in forming at least one layer of a resulting molded plastic article. Second material source 1400 supplies a second polymeric material for use in forming at least one layer of the resulting molded plastic article. System 1000 co-injects multiple streams (e.g., an inner stream, an outer stream, and an interior stream) to form multiple layers of a resulting article. Materials suitable for use with embodiments of the invention include, but are not limited to, polymer-based materials such as, polyethylene terephthalate (PET), ethylene vinyl alcohol (EVOH), MXD6 nylon, polypropylene (PP), and polycarbonates (PC). In many embodiments, the inner and outer streams are the same polymeric material. For example, in some embodiments, the inner and outer streams which form inner and outer layers are PET, while an interior stream used to form an interior layer is a material chosen to enhance the overall performance of the resulting article, or to reduce the cost of the resulting article. For example, one or more interior streams for interior layers may include one or more of a barrier material (MXD6 Nylon or EVOH), an oxygen scavenging material, a recycled material, or other performance-enhancing or cost-reducing material. The type of material used for the interior layer/stream is often different from the type of material used for the inner and outer layers/streams.

System 1000 may also include a manifold 1600 for delivery of polymeric material. In some embodiments, a manifold may consist of separate manifolds for each polymeric material. Co-injection molding system 1000 further includes nozzle assemblies 18A, 18B, 18C, 18D and mold 2400. Mold 2400 defines gates 20A, 20B, 20C, 20D, cavities 22A, 22B, 22C, 22D, and recesses 23A, 23B, 23C, 23D. In FIG. 1, each nozzle assembly (18A, 18B, 18C, and 18D) has a corresponding gate, cavity, and recess. For example, nozzle assembly 18A corresponds to gate 20A, cavity 22A, and recess 23A. Further details regarding the recesses 23A-23D are provided below with respect to FIGS. 2, and 4-8.

A first polymeric material is extruded from first material source 1200 and a second polymeric material is extruded from second material source 1400. System 1000 includes a first flow channel 1610 of manifold 1600 configured to distribute the first polymeric material to one or more of nozzles 18A-18D, and a second flow channel 1620 of manifold 1600 configured to distribute the second polymeric material to one or more of nozzles 18A-18D. First polymeric material and second polymeric material combine into a co-polymeric stream in nozzles 18A-18D, which is injected into mold cavities 22A, 22B, 22C, 22D for molding resulting articles. In nozzles 18A-18D, the first and second polymeric streams are combined to form an annular combined polymeric stream such that the second polymeric material forms an interior core stream in the combined polymeric stream while the first polymeric material forms the inner and outer streams in the combined stream. The inner and outer streams encase the interior core stream as the annular combined polymeric stream is injected from the nozzle. Methods for co-injecting multiple polymeric materials to form plastic articles with multiple layers of different materials are generally known, such as described in U.S. Pat. No. 6,908,581 and the documents incorporated therein, each of which is also incorporated by reference herein in its entirety. Further details regarding how a combined polymeric plastic stream is produced in the injection nozzle are provided in the description of FIG. 12 below.

Although system 1000 is depicted including four nozzle assemblies and a mold that defines four gates (20A-20D), four cavities (22A-22D), and four recesses (23A-23D) for forming four plastic articles simultaneously, one of ordinary skill in the art will appreciate that other embodiments may include different numbers of nozzle assemblies, gates, cavities and recesses for forming different numbers of plastic articles simultaneously. For example, embodiments may include one, two, three, four, or more than four sets of nozzle assemblies, gates, cavities and recesses. Example embodiments for large scale production systems may include more sets of nozzle assemblies, gates, cavities and recesses (e.g., 64 or more sets).

Figure 2:
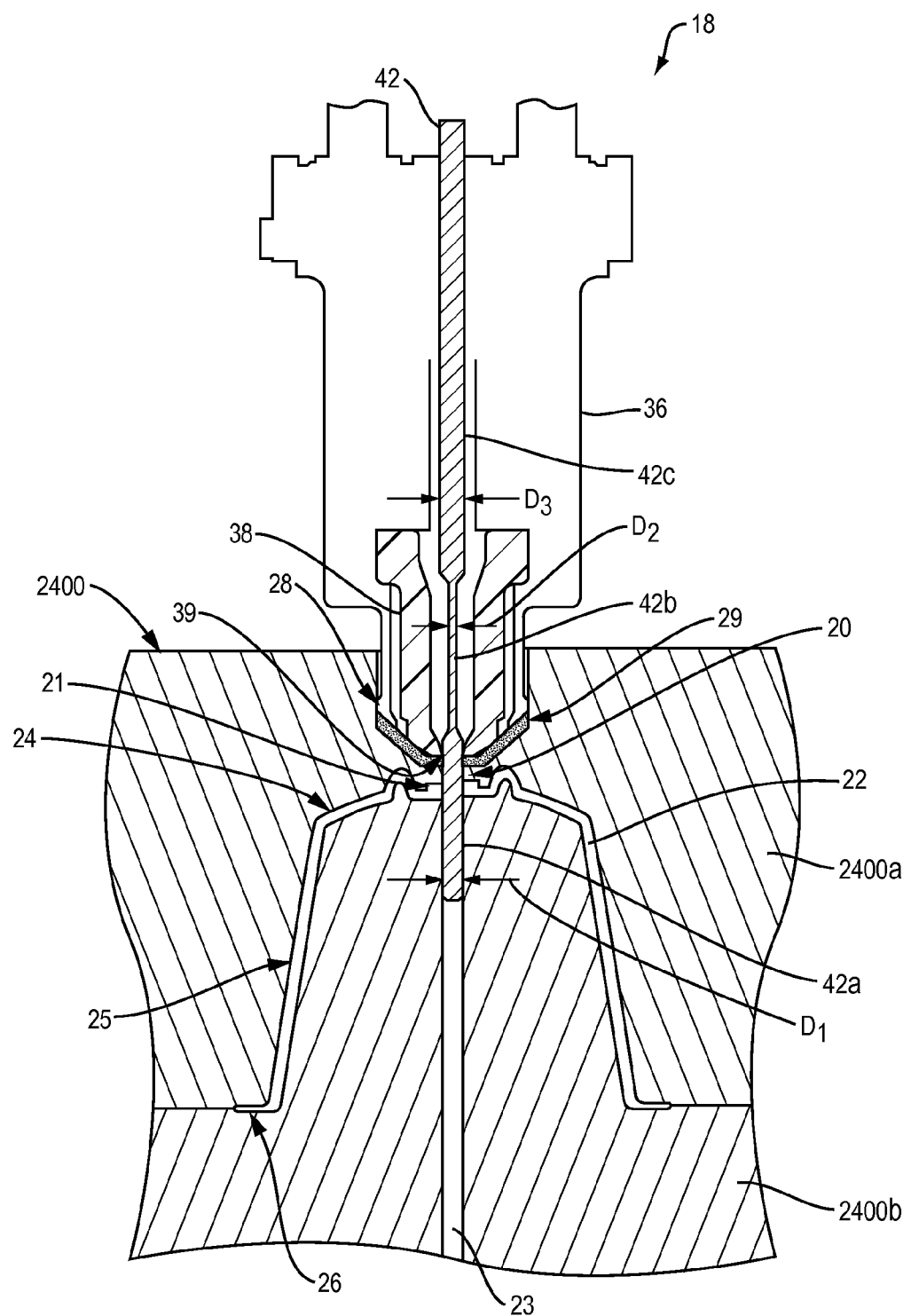
FIG. 2 schematically depicts a cross section-view of the nozzle and of one of the mold cavities of FIG. 1.

FIG. 2 schematically illustrates a nozzle 18, which may be referred to as a nozzle assembly, and the mold 2400 that defines at least one cavity 22 corresponding to a shape of a resulting plastic article. Mold 2400 also defines a corresponding gate 20, through which a combined polymeric plastic stream 70 produced by nozzle 18 flows into cavity 22. A region of cavity 22 proximal to gate 20 is referred to as a gate region 21 of the cavity.

Nozzle assembly 18 includes a nozzle body 36, a nozzle tip 38, and a valve pin 42. Nozzle tip 38 includes an output portion 39 (also referred to as an egress part of the nozzle) capable of communicating with cavity 22 to inject combined polymeric plastic stream 70 into cavity 22. In some embodiments, the nozzle tip 38 may be separated from the gate 20 of the mold 2400 by a gap 29 (e.g., a 1.5 mm separation between the output portion 39 of the cavity and the gate 20 of the mold). After the first molding cycle, much of the gap 29 is filled with polymer material (e.g., a skin material) as shown. The gap 29 filled with polymer insulates the nozzle tip 38 from the first mold portion 2400a, thereby reducing the conduction of heat from the relatively hot nozzle tip 38 to the relatively cold first mold portion 2400a. However, the nozzle body 36 and the first mold portion 2400a may form a metal to metal seal 28 (e.g., that contains the polymer material in the gap 29).

Valve pin 42 controls flow of combined polymeric plastic stream 70 from output portion 39 into cavity 20 through gate 20. Valve pin 42 includes a distal portion 42a having a first diameter $D_1$, a mid-portion 42b having a second diameter $D_2$ smaller than the first diameter, and a proximal portion 42c having a third diameter $D_3$ (see also FIG. 4). In FIG. 2, distal portion 42a of the valve pin is shown blocking a flow of combined polymer stream 70 from nozzle assembly 18 into gate 20.

Mold 2400 also includes a recess 23 that is aligned with gate 20. Recess 23 is configured to receive distal portion 42a when valve pin 42 is advanced into mold 2400 such that mid-portion 42a extends at least partially into gate region 21, (see FIGS. 5-7).

As shown, mold 2400 may include a first mold portion 2400a and a second mold portion 2400b. A co-injection molded article produced by system 1000 may be released from mold 2400 by separating second mold portion 2400b from first mold portion 2400b. Recess 23 extends into the second mold portion 2400b. In some embodiments, recess 23 may extend through or substantially through second mold portion 2400b. In other embodiments, a recess may extend only partially through second mold portion 2400b. In some embodiments, cavity 22 may have a shoulder portion 24 for molding a shoulder portion of the resulting article, a sidewall portion 25 for molding a sidewall portion of the resulting article, and a distal portion 26 for forming a distal portion of the resulting article.

Figure 3:
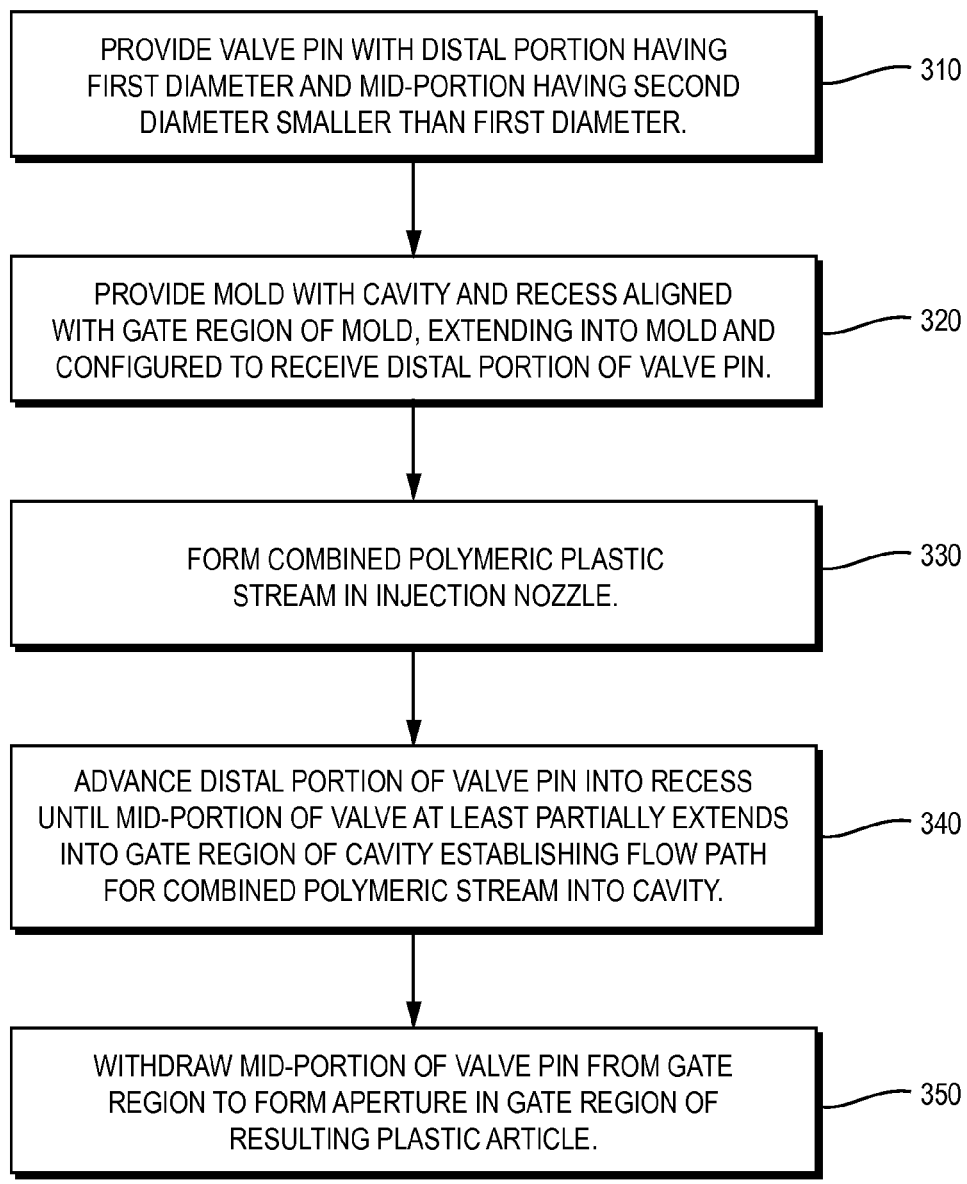
FIG. 3 is a flow chart schematically depicting a method of co-extruding a plurality of polymeric plastic material streams to produce a multi-layer molded plastic article having a molded aperture in a gate region of the article, in accordance with various embodiments.
Figure 4:
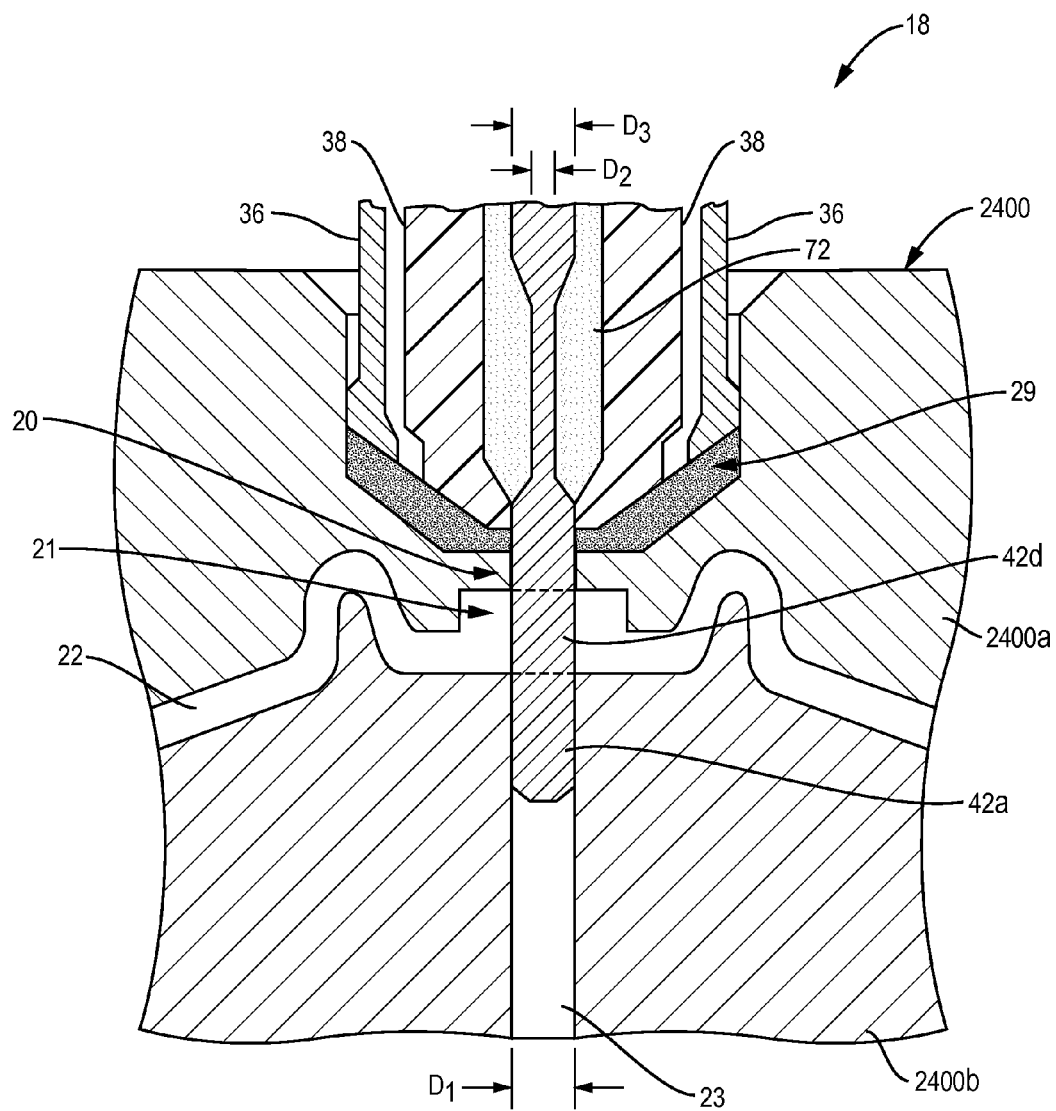
FIG. 4 is a detail view of the nozzle and the mold cavity of FIG. 2 showing a distal portion of a valve pin extending into a recess of the mold.

The flow chart in FIG. 3 schematically depicts a method 300 of co-extruding a plurality of polymeric material streams to produce a molded plastic article having an aperture formed in a gate region of the article. For illustrative purposes, the method is described with reference to exemplary system 1000; however, in other embodiments, the method may be implemented using other suitable systems. In step 310, valve pin 42 having distal portion 42a with first diameter $D_1$ and mid-portion with second diameter $D_2$ smaller than the first diameter is provided. As illustrated in FIG. 2, valve pin 42 may be provided as part of injection nozzle 18 (also referred to as nozzle assembly 18). In some embodiments, diameter $D_1$ of distal portion 42a is about the same as a diameter $D_3$ of an aperture of a tip 38 of the nozzle. As illustrated in FIG. 4, positioning valve pin distal portion 42a in the aperture of nozzle tip 38 may prevent a polymeric material stream from exiting through an output portion 39 of nozzle tip 38.

Step 320 includes providing mold 2400 defining cavity 22 corresponding to a shape of a resulting plastic article. Mold 2400 has recess 23 aligned with gate 20 of mold 2400, extending into mold 2400, and configured to receive valve pin distal portion 42a when distal portion 42a extends beyond gate region 21. FIG. 4 shows injection nozzle 18 in contact with mold 2400 with the distal portion 42a of the valve pin extending beyond gate region 21 and into recess 23. The valve pin includes an aperture forming region 42d in the valve pin distal portion 42a.

In step 330, a combined polymer plastic stream 70, which includes a first polymeric material 72 and a second polymeric material 74, is formed in injection nozzle 18. In FIGS. 1 and 4-7, first polymeric material 72 is indicated with dots and in FIGS. 1 and 5-7 second polymeric material 74 is indicated with solid shading for illustrative purposes. One of skill in the art will recognize that either or both of first polymeric material 72 and second polymeric material 74 may have an appearance that is translucent, transparent, opaque, uniform, non-uniform, or any combination of the aforementioned.

Figure 5:
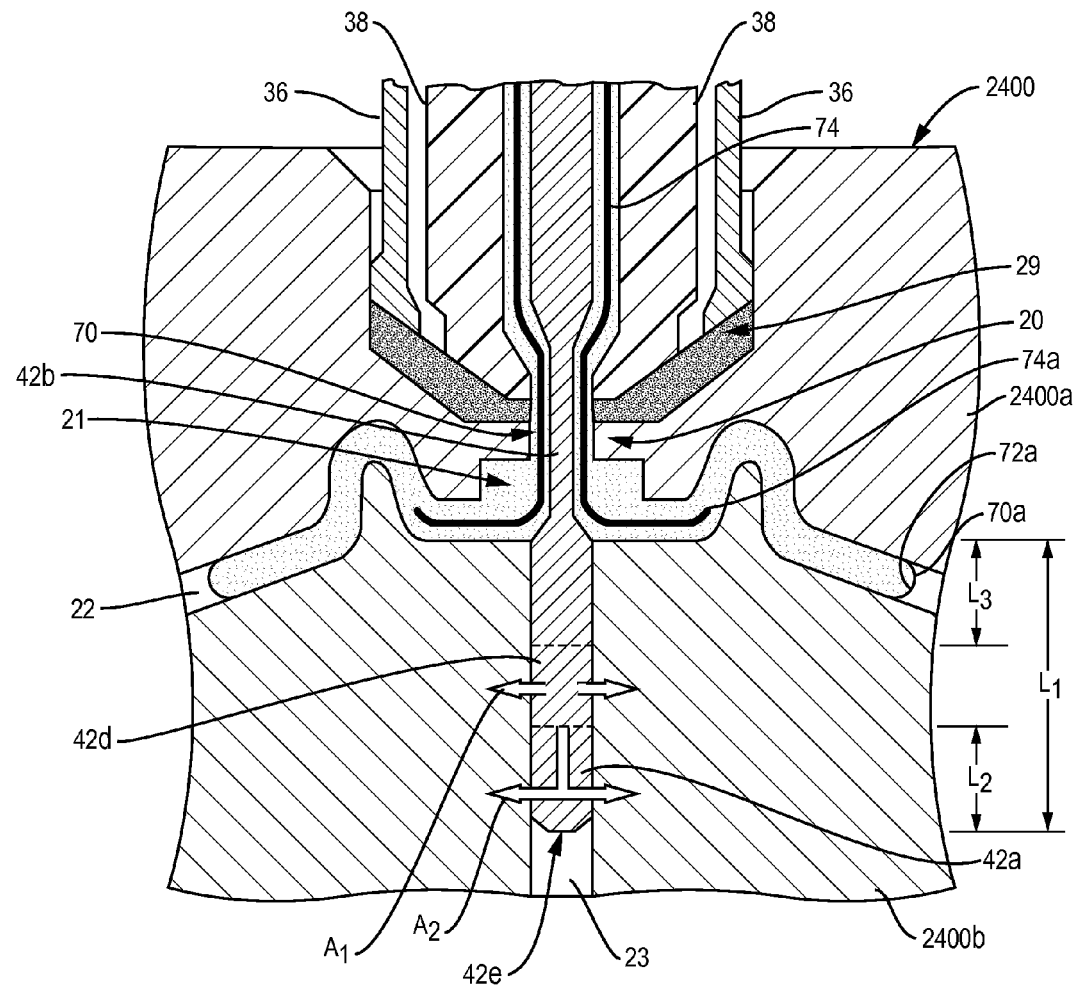
FIG. 5 is a detail view showing a mid-portion of a valve pin extending into a gate region of the cavity and a combined polymeric plastic stream entering the cavity.

In step 340, distal portion 42a of the valve pin is advanced into recess 23 until mid-portion 42b of the valve pin at least partially extends into gate region 21 of cavity 22. As illustrated in FIG. 5, a flow path for the combined polymer stream 70 into cavity 23 is established when valve pin mid-portion 42b at least partially extends into gate region 21. Combined polymer stream 70 enters cavity 22 by flowing between a surface of cavity 22 at gate 20 and a surface of valve pin mid-portion 42b. In some embodiments, at least a portion of valve pin mid-portion 42b is heated to facilitate flow of combined polymer stream 70 past mid-portion 42b and into cavity 22. During injection into the cavity, the valve pin mid-portion 42b should be at an elevated temperature with respect to the cavity 2400 (e.g., at a temperature near the polymer temperature in the nozzle) to facilitate flow of polymer past the mid-portion 42b when filling the cavity. For example, if the polymer temperature in the nozzle is 230° C., the temperature of the valve pin mid-portion may be at least 200° C. In many embodiments, valve pin mid-portion 42b has a higher temperature than the aperture forming portion 42d of the valve pin while combined polymeric stream 70 is being injected into cavity 22. In many embodiments, valve pin mid-portion 42b is heated by conductive heat transfer from nozzle tip 38 and by heat transfer from the flowing combined polymer stream 70. In some embodiments, valve pin 42 may be heated by electrical heating elements embedded or attached to the valve pin 42.

Figure 6:
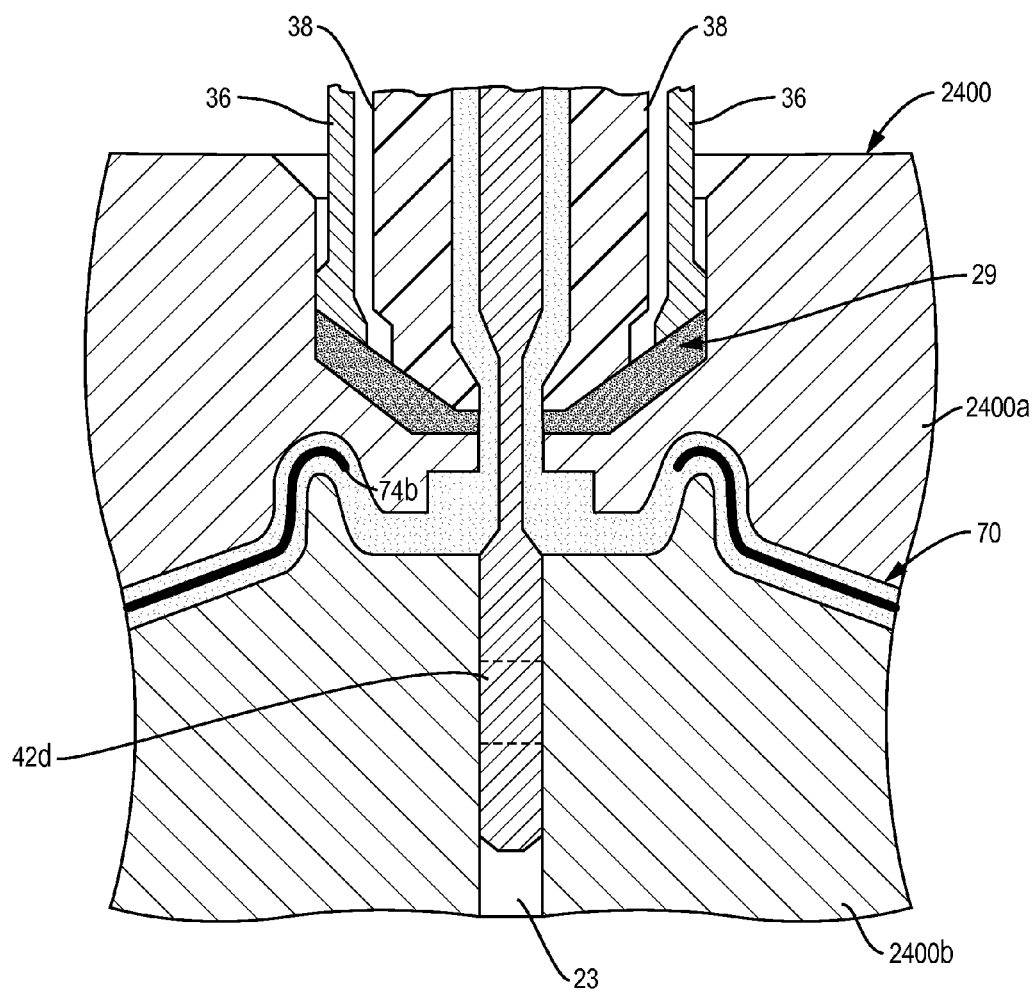
FIG. 6 is detail view after the cavity is substantially filled with the injected co-polymer stream.

As illustrated in FIG. 5, a leading edge 70a of the combined polymeric stream may include only one polymeric material with a leading edge 74a of the second material portion behind a leading edge of the first material portion 72a. As illustrated in FIG. 6, in some embodiments, after combined polymer stream 70 enters cavity 22 and substantially fills cavity 22, combined polymer stream 70 may become a stream including the first material 72, but not second material 74 creating a trailing edge 74b of the first material stream.

Figure 7:
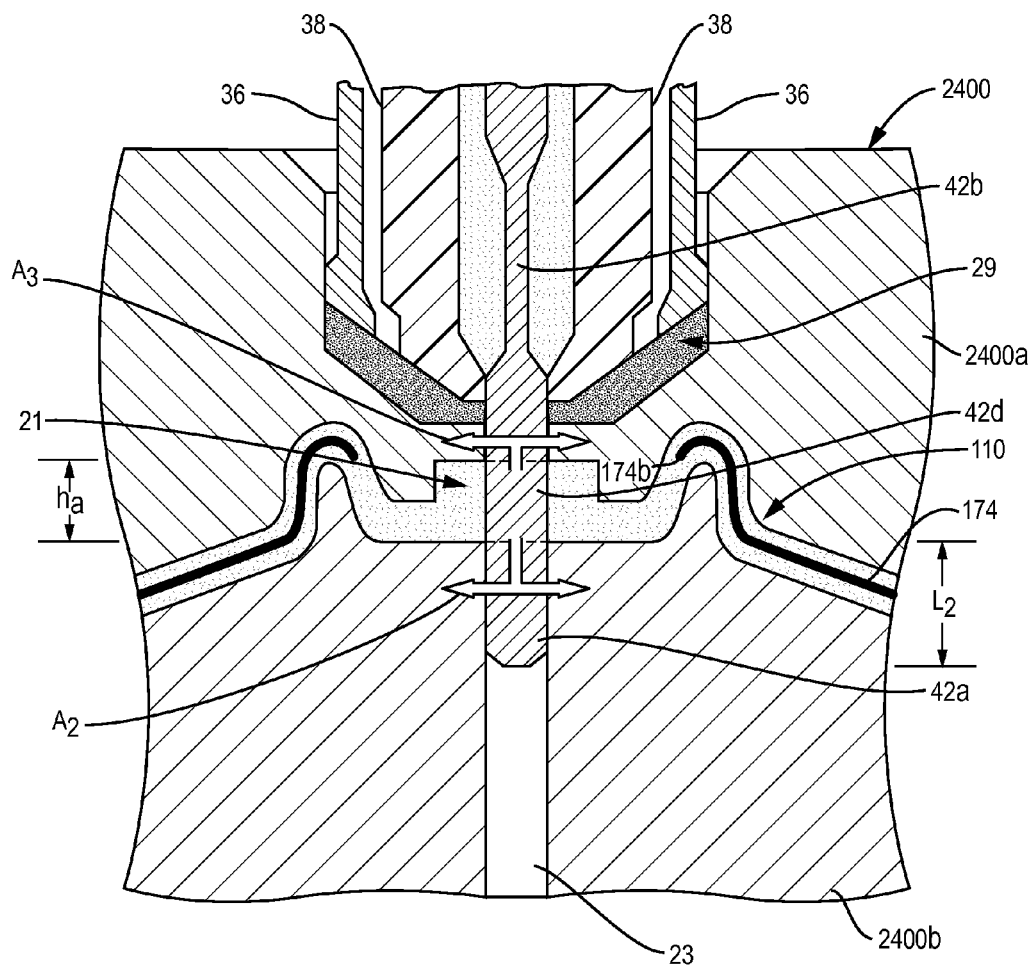
FIG. 7 is a detail view as a distal portion of the valve pin is being withdrawn from the cavity forming a molded aperture at the gate region.

After mold 2400 has been filled or substantially filled with the combined polymer stream, as shown in FIG. 6, the injected combined polymer material 70 begins to cool and set. As shown in FIG. 7, before the injected combined polymer material 70 fully sets, valve pin distal portion 42a is partially withdrawn from recess 23 and into gate region 21 of mold 2400 forming an aperture 120 at gate region 21 of the resulting molded plastic article 110 (see step 350 of FIG. 3). As illustrated in FIG. 7, formed aperture 120 coincides with the aperture forming region 42d of the valve pin.

After the valve pin distal portion 32a is partially withdrawn from recess 23 into gate region 21, the aperture forming region 42d of the valve pin must reach an average temperature below the solidification temperature of the polymer stream to form the aperture. For example, in some embodiments, the aperture forming region 42d may need to reach an average temperature of no more than 10° C. to 100° C. above the temperature of mold 2400. In some embodiments having inner and outer layers of PP, the temperature of the aperture forming region 42d may reach as high as between 20° C. to 40° C. below the melting temperature of PP when forming the aperture.

In some embodiments, at least some of distal portion 42a (e.g., aperture forming region 42d) is cooled before being withdrawn and/or is cooled while being withdrawn. In some embodiments, valve pin distal portion 42a is cooled by contact with mold portion 2400b during injection of polymer into the cavity as shown in FIGS. 5 and 6. A separation (labeled $L_3$) between the higher temperature valve pin mid-portion 42b, which is in contact with the flowing polymer stream 70, and the lower temperature aperture forming portion 42d, which is in contact with the mold 2400, helps to maintain the temperature difference between the valve pin mid-portion 42b and the aperture forming region 42d. Increasing the size of the separation $L_3$ makes the temperature difference easier to maintain, but it increases the distance that the valve pin 42 must be withdrawn from the injection position to form the aperture.

As shown in FIG. 5 during injection, the aperture forming region 42d is cooled by heat flowing laterally into the mold portion 2400b as indicated by arrows $A_1$, and by heat flowing along the valve pin and then laterally into the mold portion 2400b as indicated by arrows $A_2$. The extension (labeled $L_2$) of the valve pin distal portion 42a beyond the aperture forming region 42d aids in conducting heat away from the aperture forming region 42d. In some embodiments, the valve pin distal portion 42a may have a beveled distal end 42e to aid in aligning the distal portion 42a with the recess 23. The total length of the distal end portion 42a is labeled $L_1$ herein.

As shown in FIG. 7, the heat absorbed by the aperture forming region 42d during forming of the aperture of the molded article must be transferred to the mold 2400b, 2400a to maintain the temperature of the aperture forming region 42d in a suitable temperature range (e.g., 10° C. to 100° C. above the temperature of mold 2400). While the aperture is being formed, heat flows from the aperture forming region 42d along the valve pin 42 away from the nozzle and laterally outward through contact with the mold portion 2400b as indicated by arrows $A_2$, and flows along the valve pin toward the nozzle and laterally outward through contact with the mold portion 2400a as indicated by arrows $A_3$.

The lengths $L_1$, $L_2$, $L_3$, the diametrical clearance (too small to be shown) between the valve pin distal portion 42a and the diameters of recess 23 and of gate 20, the thickness of the polymer in the aperture region $h_a$, and the temperature of the polymer in the aperture region will affect the heat absorbed by the aperture forming region 42d during step 350. The required time for the aperture forming region 42d to return to the desired temperature range is also affected by the same variables. These variables may be adjusted to shorten the time required for aperture formation and to achieve an acceptable overall cycle time. After aperture forming region 42 reaches the desired temperature range and the aperture is formed, the valve pin 42 may return to the position shown in FIG. 4, the mold opens and the plastic article is ejected from the mold (e.g., mechanically or pneumatically).

Figure 8:
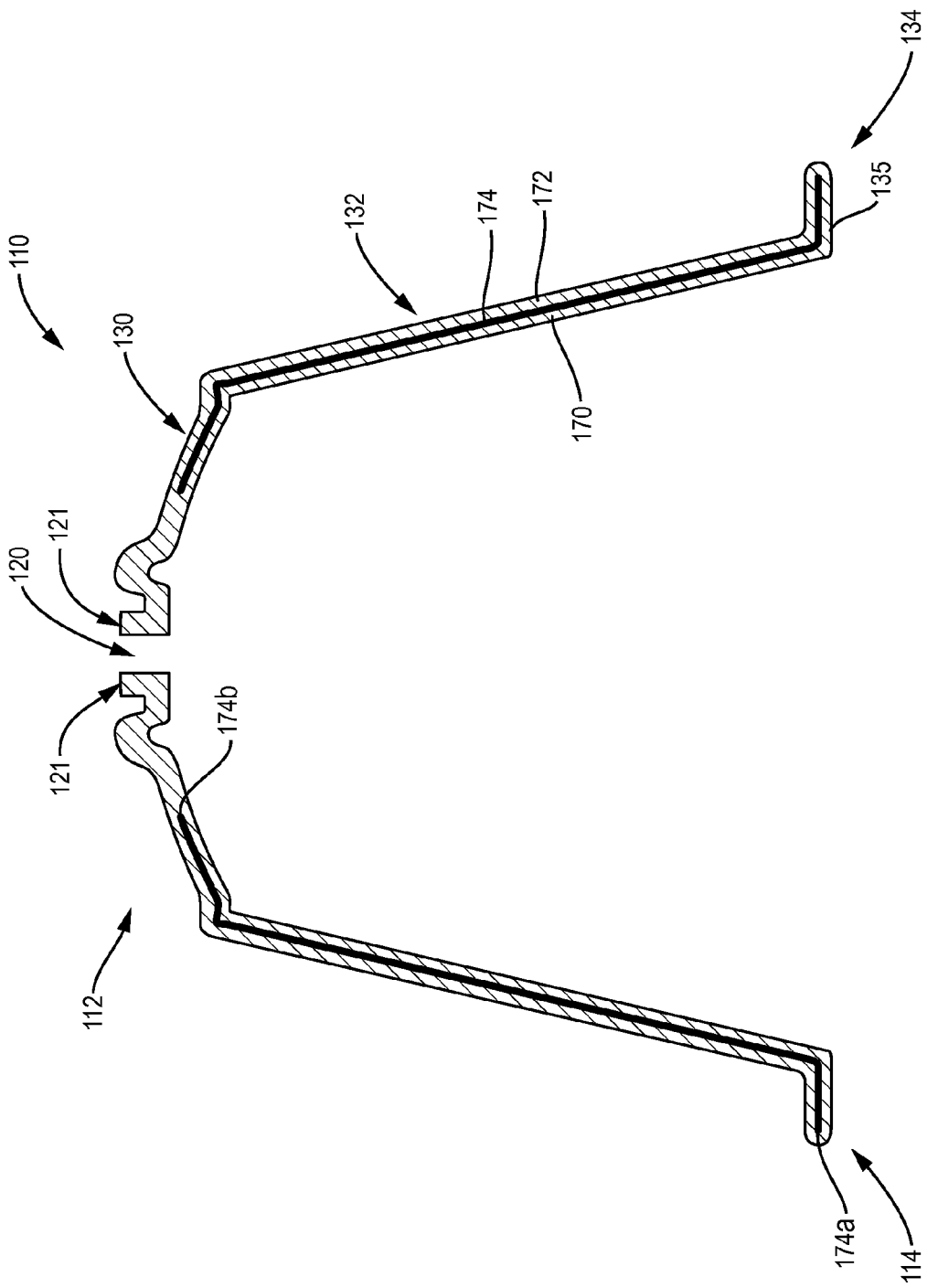
FIG. 8 schematically illustrates a cross-sectional view of the resulting co-injection-molded plastic article having a molded aperture at the gate region of the article.

FIG. 8 shows resulting plastic article 110 after the cavity has been filled, the valve pin distal portion has been withdrawn from the gate region of the cavity forming molded aperture 120, and resulting plastic article 110 has been released from the mold. Resulting plastic article 110 includes a sidewall portion 132, molded aperture 120 in a gate region 121 of the article, and a shoulder portion 130 disposed between sidewall portion 132 and gate region 121. As illustrated in FIG. 8, resulting plastic article 110 may include an inner layer 170 and an outer layer 172 of the first polymeric material, which together generally conform to the desired end shape of the final container or article, accounting for manufacturing requirements (e.g., thermal expansion/contraction) as is known. In some embodiments, the inner layer 170 and the outer layer 172 may be referred to as the skin of the article. The second polymeric material forms interior layer 174, which may be referred to as a "core layer," disposed between inner layer 170 and outer layer 172. Interior layer 174 may be a barrier layer, a gas scavenging layer, and/or a desiccant layer. For example, a gas barrier material of interior layer 174 may be EVOH or other suitable materials, which are known or may become known, that sufficiently prevent gases, for example, oxygen, from permeating through the article, i.e., from the outside to the inside and vice versa. Though PET, PP and EVOH are commonly used materials, it should be understood what other suitable materials may be used, and that the various embodiments are suitable for use with other polymeric materials.

Resulting article 110 has a first end portion 112, which includes a gate region 121, and an injection-molded aperture 120, and a second end portion 114. In some embodiments, the second end portion of the article may include a sealing surface. For example, second end portion 114 of article 110 includes a flange 134 with a sealing surface 135. In different embodiments, various types of sealing surfaces may be employed (e.g. surfaces configured for heat-sealing and crimping, threaded surfaces, etc.). In different embodiments, the second end portion of the article may have a structure other than a flange (e.g., an open end tube to be welded closed such as a toothpaste tube). Various methods may be used for sealing the sealing surface 135 (e.g., heat-sealing, crimping, threading, and other known methods).

The amount that the interior layer extends through the article varies for different embodiments. In some embodiments the interior layer may not extend throughout the article. For example, in article 110 of FIG. 8, interior layer 174 extends from sidewall portion 132 to shoulder portion 130 and terminates in the shoulder portion at 174b before gate region 121. Interior layer 174 also extends from sidewall portion 132 to flange 134 and terminates at 174a without extending to an edge of flange 134. In some embodiments, an interior layer may extend through the shoulder portion and into the gate region (e.g., see FIGS. 10 and 11 described below) or may terminate in the sidewall portion.

Throughout the figures, thicknesses are exaggerated for illustrative purposes. For example, a thickness of sidewall portion 25 of cavity 23 is exaggerated in FIGS. 1 and 4-7. In FIGS. 7 and 8, a thickness of sidewall portion 132 of resulting plastic article 110 is exaggerated. As another example, thicknesses of inner layer 170 outer layer 172 and interior layer 174 are exaggerated in FIGS. 7 and 8. Further, relative thicknesses are not representative. For example, in FIGS. 7 and 8, the thickness of interior layer 174 is exaggerated relative to thicknesses of inner layer 170 and outer layer 172.

In some embodiments, a resulting plastic article may be configured for use as a container (e.g., for containing food, beverages, pharmaceutical, nutraceuticals and/or other gas-sensitive products). For example, FIG. 9 shows plastic article 110 incorporated into a container 210 for storing a food (e.g., ground coffee beans). Container 210 may include a first seal 212 that seals the first end portion 112 of the article. Container 210 may include a second seal 214 that seals the second end portion 114 of the article on sealing surface 135. Various methods may be used for sealing the sealing surface 135 (e.g., heat-sealing, crimping, threading, and other known methods). First seal 212, second seal 214, and sidewall portion 110, enclose a sealed container volume 216 for storing a product.

Substantially all of the surface area of the article exposed to the product may include an interior layer. As used herein, the term "substantially" or "substantially fully" means 95%-100% coverage of the interior layer across the entire surface area of the article exposed to the container volume for storing product. As illustrated in FIG. 9, interior layer 174 need not extend to an edge of flange 134 or to gate region 121 because those portions of the article 110 are separated from the container volume 216 for storing product by the first seal 212 and by the second seal 214 respectively.

FIG. 10 shows a variation of the container 210 that includes a smaller first seal 212' for the first end, which is external to the aperture 120. In this embodiment, the core layer 174' extends through the shoulder portion 130' of the article and terminates 174b' closer to the aperture 220', specifically within a diameter of the external first seal 212', which is disposed on a sealing surface 136'. The external first seal 212' and the extended core layer 174' effectively seal the first end of the article. In some embodiments, the external first seal 212' is punctured or removed prior to use.

A container may include additional functional features, some of which are illustrated by the container 210 of FIG. 9. For example, container 210 may include a filter 217 for filtering a product (e.g., for filtering coffee when water or steam is injected into dry coffee held in container volume 216 through second seal 214). Container 210 may include a piercing element 218 configured to pierce first seal 212 when first seal 212 bulges due to increasing internal pressure in container volume 216.

FIG. 11 depicts another container including a plastic article formed in accordance with various embodiments. A container 405 (e.g., a tube for toothpaste, ointment, or other viscous product) includes a multilayer co-injection-molded plastic article 410 formed with a first end portion 412 including a gate region 421 having an injection-molded aperture 420, and a second end portion 414 that is initially open to permit filling container 405 with product. Plastic article 410 includes an inner layer 470 and an outer layer 472 of a first polymeric material, which may be referred to as skin layers. An interior layer 474 including a second polymeric material is disposed between inner layer 470 and outer layer 472. Second polymeric material may be a barrier material, an oxygen scavenging material, a recycled material, and/or other performance-enhancing or cost-reducing material.

The container may include one or more seals for sealing a first end portion and/or a second end portion of the container. For example, container 405 includes a first seal 415 on a sealing surface 436 for sealing injection-formed aperture 420 of first end portion 412 of the container. Container 405 also includes a second seal 415 in a sealing surface 435 for sealing the initially open second end portion 414 of the container. The first seal and the second seal may be any suitable seal including, but not limited to, a heat seal, a crimp seal, an adhesive seal, a foil seal, a plug, etc. For example, first seal 415 is a foil seal adhered to gate region 421 and second seal 417 is a heat/crimp seal. First seal 415, second seal 417, sidewall portion 432, shoulder portion 430, and gate region 421 form a sealed volume 416 for enclosing a product. For an inner layer 470 and an outer layer 472 of a relatively gas permeable polymer, such as PP or PE, it may be desirable for the interior layer 474 to extend through the shoulder portion 430 and terminate proximal to the aperture seal 415 as shown in FIG. 11.

As shown in FIG. 12, an interior layer 474' of the second material need not extend throughout portions of article 410 exposed to sealed volume 416 for relatively gas impermeable polymers such as PET. FIG. 12 depicts a variation of the container 410 in which the interior layer 474' terminates in the shoulder portion 430' of the article. In some embodiments including a less gas permeable skin material (e.g., PET), the shoulder portion 430' of the article has a substantially larger wall thickness $T_1$ than that of the sidewall portion $T_2$, and the larger wall thickness provides a sufficient barrier to prevent gas permeation in the shoulder portion 430' of the article.

Figure 13:
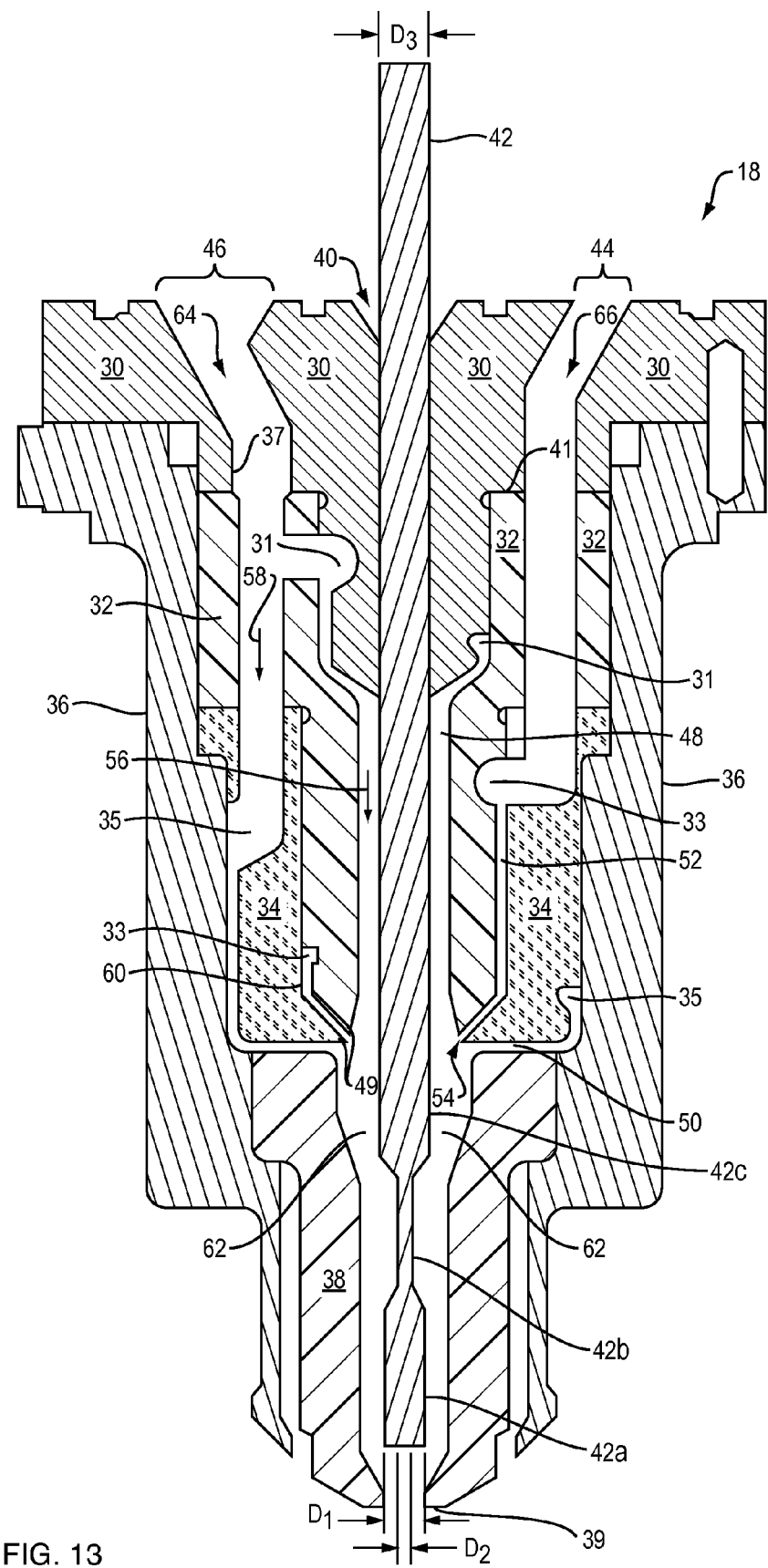
FIG. 13 schematically depicts an exemplary nozzle assembly suitable for practicing embodiments taught herein.

FIG. 13 illustrates an exemplary nozzle assembly suitable for practicing embodiments taught herein. Nozzle assembly 18 includes an inner combining means 30, a middle combining means 32, and an outer combining means 34. Nozzle assembly 18 further includes nozzle body 36 and nozzle tip 38. Inner combining means 30, middle combining means 32, outer combining means 34, nozzle body 36, and nozzle tip 38 cooperatively combine to form a number of conical, annular, and axial passages and channels in nozzle assembly 18. The nozzle assembly 18 is well suited for use in a co-injecting system, for example system 1000, for forming a plastic object having two or more layers.

Inner combining means 30 includes a first inlet 46 to receive a first polymeric material 64, such as a skin material (i.e., inner and outer layer material), and a second inlet 44 to receive a second polymeric material 66, such as a core material (i.e., interior layer material). The inner combining means 30 further includes a through bore 40 configured to receive a valve pin 42. The through bore 40 extends through the middle combining means 32, and through a portion of the outer combining means 34 to allow the valve pin 42 to move in an axial direction along a longitudinal axis of the nozzle assembly 18. Through bore 40 has an inner wall diameter that varies along a central longitudinal axis of the nozzle assembly 18. Valve pin 42 is movable in an axial direction along the central longitudinal axis of nozzle assembly 18 to assist in controlling the flow of the first polymeric material 64 and second polymeric material 66 through nozzle assembly 18 and into mold 24.

Middle combining means 32 cooperatively engages with the inner combining means 30 form a portion of the plurality of annular flow channels in nozzle assembly 18. Middle combining means 32 receives from channel 37 the first polymeric material 64 and receives from channel 41 the second polymeric material 66 to manipulate the flow of each of the polymeric materials through a plurality of annular fluid carrying passages or channels. The flow manipulation carried out by middle combining means 32 initiates the creation of an outer material stream 58 and an inner material stream 56 that together encapsulate an interior material stream 60.

The middle combining means 32 when coupled with the inner combining means 30 forms a wrapped-coat-hanger die 31 that circumferentially extends around the through bore 40 and valve pin 42. Wrapped-coat-hanger die 31 provides annular fluid flow passage 48 with a uniform melt distribution of the first polymeric material 64. Annular fluid flow passage 48 channels an annular flow stream of the inner material stream 56 into stream combination area 54 through an orifice.

Outer combining means 34 cooperatively engages with middle combining means 32 to form one or more fluid carrying passages or channels to manipulate the second polymeric material 66 forming an interior layer of the resulting plastic object. The outer combining means 34 when coupled with the middle combining means 32 forms a wrapped-coat-hanger die 33 that circumferentially extends around inner material stream 56, through bore 40, and valve pin 42. Wrapped-coat-hanger die 33 provides conical fluid flow passage 52 with a uniform melt distribution of the second polymeric material 66. Conical flow passage 52 feeds an annular stream of the second polymeric material 66 into stream combination area 54 through another orifice.

The outer combining means 34 cooperatively engages with nozzle body 36. The outer combining means 34 when coupled with the nozzle body 36 forms wrapped-coat-hanger die 35 that circumferentially extends around the interior layer stream 52, the inner layer stream 56, the through bore 40, and the valve pin 42. Wrapped-coat-hanger die 35 provides radial fluid flow passage 50 with a uniform melt distribution of the first polymeric material 64. Radial fluid flow passage 50 feeds stream combination area 54 with a flow of first polymeric material 64 through an orifice. The first polymeric material 64 fed into the stream combination area 54 through the orifice forms the outer layer of a resulting molded object.

Fluid flow passages 48, 50, and 52 feed stream combination area 54 with the outer material stream 58, the inner material stream 56, and the interior material stream 60. A portion of the nozzle tip 38, a portion of the outer combining means 34, a portion of the middle combining means 32, and a portion of the valve pin 42, in combination form the stream combination area 54. Stream combination area 54 combines in a simultaneous or near simultaneous manner the outer material stream 58 received from the fluid flow passage 50, the inner material stream 56 received from the fluid flow passage 48, and the interior material stream 60 received from the fluid flow passage 52 to form annular output stream.

The channels, bores and passageways of the inner combining means 30, the middle combining means 32 and the outer combining means 34 and more specifically the channels, bores and passageways associated with the formation and the flow of inner and outer layer material in the nozzle assembly 18 may be sized, defined, adapted and configured to control or produce a desired volumetric flow ratio as discussed above. In this manner, the valve pin 42 may remain in a fixed position and does not need to be moved to control or form a particular volumetric flow ratio. In other words, the nozzle assembly 18 has a channel configuration and structure to output a desired or selected volumetric flow ratio without the need of an associated controller or microprocessor. In some exemplary embodiments, the valve pin 42 may be controlled by a controller or microprocessor to control the volumetric flow ratio.

The annular output stream 49 flows from the stream combination area 54 through fluid flow passage 62 to output portion 39 of nozzle assembly 18. Fluid flow passage 62 has an annular inner passage that radially extends about through bore 40 and axially extends from the stream combination area 54 to the output portion 39. The output portion 39 communicates with a gate of a mold, such as one of gates 20A-20D.

As explained above, by advancing a mid-portion of the valve pin 42b into a gate region of a mold cavity allowing a co-polymer stream to fill the cavity, and then withdrawing the valve pin distal portion 42a from a recess of the mold through the gate region of the mold cavity after the mold is filled or substantially filled, an injection-molded aperture is produced in a gate region of the resulting article. As illustrated in FIG. 13, the same valve pin 42 may be used to produce an article without an aperture in the gate region by withdrawing the valve pin 42 to allow a co-polymer stream to exit the output portion, as opposed to advancing the valve pin.

The annular output stream 49 formed by the stream combination area 54 has an outer annular skin layer and an inner annular skin layer formed of the first polymeric material 64, and an interior or core annular layer formed of the second polymeric material 66. The inner and outer skin layers of the first polymeric material 64 may each have a substantially like cross sectional area as the materials flow through the fluid flow passage 62 to the output portion 39. Typical ratios of inner to outer volumetric flow rate are between 80:20 and 20:80. The exact ratio is chosen to locate the interior layer at the desire position within the wall of the molded article. The inner and outer skin layers of the first polymeric material 64 encapsulate the interior layer of the second polymeric material 66, which forms a core portion of a resulting plastic object. Upon injection from the nozzle assembly 18, the combined polymeric stream 49, includes an interior stream that flows along concentric or annular streamlines between the inner and outer polymeric streams.

FIG. 14 illustrates an exemplary computing environment suitable for practicing exemplary embodiments taught herein. The environment may include a co-injection control device 900 coupled, wired, wirelessly or a hybrid of wired and wirelessly, to co-injection system 1000. The co-injection control device 900 is programmable to implement executable Flow Control Code 950 for forming a barrier layer and/or scavenger layer. Co-injection control device 900 includes one or more computer-readable media for storing one or more computer-executable instructions or software for implementing exemplary embodiments. The computer-readable media may include, but are not limited to, one or more types of hardware memory, non-transitory tangible media, etc. For example, memory 906 included in the co-injection control device 900 may store computer-executable instructions or software, e.g., instructions for implementing and processing every module of the executable Flow Control Code 950. Co-injection control device 900 also includes processor 902 and, one or more processor(s) 902' for executing software stored in the memory 906, and other programs for controlling system hardware. Processor 902 and processor(s) 902' each can be a single core processor or multiple core (904 and 904') processor.

Virtualization may be employed in co-injection control device 900 so that infrastructure and resources in the computing device can be shared dynamically. Virtualized processors may also be used with the executable Flow Control Code 950 and other software in storage 916. A virtual machine 914 may be provided to handle a process running on multiple processors so that the process appears to be using only one computing resource rather than multiple. Multiple virtual machines can also be used with one processor.

Memory 906 may include a computer system memory or random access memory, such as DRAM, SRAM, EDO RAM, etc. Memory 906 may include other types of memory as well, or combinations thereof.

A user may interact with co-injection control device 900 through a visual display device 922, such as a computer monitor, which may display the user interfaces 924 or any other interface. The visual display device 922 may also display other aspects or elements of exemplary embodiments, e.g., materials databases, production information, etc. Co-injection control device 900 may include other I/O devices such a keyboard or a multi-point touch interface 908 and a pointing device 910, for example a mouse, for receiving input from a user. The keyboard 908 and the pointing device 910 may be connected to the visual display device 922. Co-injection control device 900 may include other suitable conventional I/O peripherals. Co-injection control device 900 may further include a storage device 916, such as a hard-drive, CD-ROM, or other non-transitory computer readable media, for storing an operating system 918 and other related software, and for storing executable Flow Control Code 950.

Co-injection control device 900 may include a network interface 912 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 912 may include a built-in network adapter, network interface card, PCMCIA network card, card bus network adapter, wireless network adapter, USB network adapter, modem or any other device suitable for interfacing authorization computing device 900 to any type of network capable of communication and performing the operations described herein. Moreover, co-injection control device 900 may be any computer system such as a workstation, desktop computer, server, laptop, handheld computer or other form of computing or telecommunications device that is capable of communication and that has sufficient processor power and memory capacity to perform the operations described herein.

Co-injection control device 900 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Flow Control Code 950 includes executable code executable by the processor 902 to control the co-injection system 1000 to control a position of the valve pin 42 for controlling flow of the co-polymer stream into the mold cavity and forming an aperture in a gate region of a resulting multi-layer plastic article. The executable code executable by the processor 902 may also control a temperature of at least portions of the gate pin 42, and control a temperature of at least portions of the mold 2400. The executable code may be executable by the processor 902 to selectively control a volumetric flow volume of the inner and outer polymeric streams, control a position of the interior core material stream relative to a velocity flow front of the combined polymeric stream, and control extrusion start time of the interior core stream relative to the extrusion start time of the inner and outer polymeric streams. Co-injection systems taught herein facilitate the co-injection molding of container such as food or beverage containers.

As may be recognized by those of ordinary skill in the pertinent art based on the teachings herein, numerous changes and modifications may be made to the above-described and other embodiments of the present disclosure without departing from the spirit of the invention as defined in the appended claims. Accordingly, this detailed description of embodiments is to be taken in an illustrative, as opposed to a limiting, sense. Those skilled in the art will recognize, or be able to ascertain using no more than routine experimentation, many equivalents to the specific embodiments of the described herein. Such equivalents are intended to be encompassed by the following claims.

What is claimed is:

1. A method of co-extruding a plurality of polymeric material streams to produce a molded plastic article, the method comprising:
   providing a valve pin having a distal portion with a first diameter and a mid-portion with a second diameter smaller than the first diameter;
   providing a mold defining a cavity corresponding to a shape of a resulting molded plastic article, the mold having a recess aligned with a gate region of the mold, extending into the mold and configured to receive the distal portion of the valve pin when the distal portion of the valve pin extends beyond the gate region;
   forming a combined polymeric stream in an injection nozzle, the combined polymeric stream comprising a first polymeric material and a second polymeric material;
   advancing the distal portion of the valve pin into the recess until the mid-portion of the valve pin at least partially extends into the gate region, thereby establishing a flow path for the combined polymeric stream into the cavity at the gate region for forming a molded plastic article having at least one layer of the first polymeric material and at least one layer of the second polymeric material; and
   withdrawing the mid-portion of the valve pin from the gate region, thereby forming an injection-molded aperture in the resulting molded plastic article at the gate region.

2. The method of claim 1, wherein the aperture coincides with the distal portion of the valve pin.

3. The method of claim 1, further comprising heating the mid-portion of the valve pin.

4. The method of claim 1, wherein an outer stream of the first polymeric material encases an interior stream of the second polymeric material in the combined polymeric stream.

5. The method of claim 4, wherein the cavity includes a sidewall portion and wherein the flow of combined polymeric flow stream into the sidewall portion forms an inner layer of the first polymeric material, an outer layer of the first polymeric material, and an interior layer of the second polymeric material between the inner layer and the outer layer.

6. The method of claim 5, wherein the interior layer is a barrier layer or a scavenger layer.

7. The method of claim 6, wherein the cavity further includes a shoulder portion between the sidewall portion and the gate region and wherein the interior layer extends from the sidewall portion into the shoulder portion.

8. The method of claim 7, wherein the interior layer terminates in the shoulder portion.

9. The method of claim 1, wherein the interior layer terminates proximate to the aperture.

10. The method of claim 1, wherein the article has a sealable portion and wherein the interior layer terminates proximate to the sealable portion.

* * * * *